Jan. 11, 1944.  E. C. CROWLEY  2,339,219
METHOD AND MACHINE FOR MAKING TUBES
Filed Aug. 3, 1940  8 Sheets-Sheet 5

INVENTOR
*EDWARD CHASE CROWLEY*
BY
Howard P. King
ATTORNEY

Jan. 11, 1944. E. C. CROWLEY 2,339,219

METHOD AND MACHINE FOR MAKING TUBES

Filed Aug. 3, 1940 8 Sheets-Sheet 6

INVENTOR
*EDWARD CHASE CROWLEY*
BY
*Howard P. King*
ATTORNEY

Jan. 11, 1944. E. C. CROWLEY 2,339,219
METHOD AND MACHINE FOR MAKING TUBES
Filed Aug. 3, 1940 8 Sheets-Sheet 7

INVENTOR
EDWARD CHASE CROWLEY
BY Howard P. King
ATTORNEY

Jan. 11, 1944.  E. C. CROWLEY  2,339,219
METHOD AND MACHINE FOR MAKING TUBES
Filed Aug. 3, 1940  8 Sheets-Sheet 8

INVENTOR
EDWARD CHASE CROWLEY
BY
Howard P. King
ATTORNEY

Patented Jan. 11, 1944

2,339,219

UNITED STATES PATENT OFFICE 2,339,219

METHOD AND MACHINE FOR MAKING TUBES

Edward Chase Crowley, Rhinebeck, N. Y.

Application August 3, 1940, Serial No. 350,640

20 Claims. (Cl. 113—35)

This invention relates to a method and machine for making tubes, and more particularly to machines for producing spirally wound tubes.

An object of the invention is to provide a machine for producing a tube composed of helically wound strip material in interlocked formation and wherein such tube has a cross-section of alternate curves and straight lines.

A further object of the invention is to maintain constant feeding of the strip into the machine at a uniform speed both while the sides and corners of the tube are being formed.

A further object of the invention is the provision of improved means and method for periodically bending the strip to form the corners of the tube at any desired radius of curvature and with any desired number of degrees of the circle fixed by the selected radius.

A further object of the invention is to utilize the advancing impetus of the strip for shifting the tube laterally within the tube-forming cage and to provide auxiliary means for shifting laterally long and heavy tubes.

A further object of the invention is to utilize intermittent rotation of the tube-forming cage as the actuating force for bending the strip to form a corner.

A further object of the invention is to automatically release the bending means when the bend is completed and utilize the advancing force of the strip to return the bending means to initial position ready to make the next bend.

A further object is to provide support for the material in all the positions and during and after all the movements to which it is subjected.

A further object is to utilize the gore formed by the first and last convolutions on the helical winding of any predetermined length of strip material to make end closures of such tubular section of material integral with the main body of the tube.

Further objects of the invention are to provide a structure which will enable tubes to be formed from any desired width of strips and gauge thickness of material; to enable tubes to be formed having any desired number of flat sides; to secure simplicity of construction and operation; to provide tight joints throughout the sides and corners along the entire edges of the spiral convolutions; and to obtain other advantages and results as may be brought out in the following description.

The invention consists of novel parts, constructions, arrangements, combinations and improvements herein shown and described. The accompanying drawings, referred to herein and constituting a part hereof, illustrate the invention, and while those drawings and description of necessity are specific to selected embodiments, the same are to be considered as explanatory rather than restrictive, serving the purpose of explaining the inventive concept and features involved in my invention. Referring to said drawings, wherein like numerals of reference indicate similar parts through the several views:

Figures 1, 14:
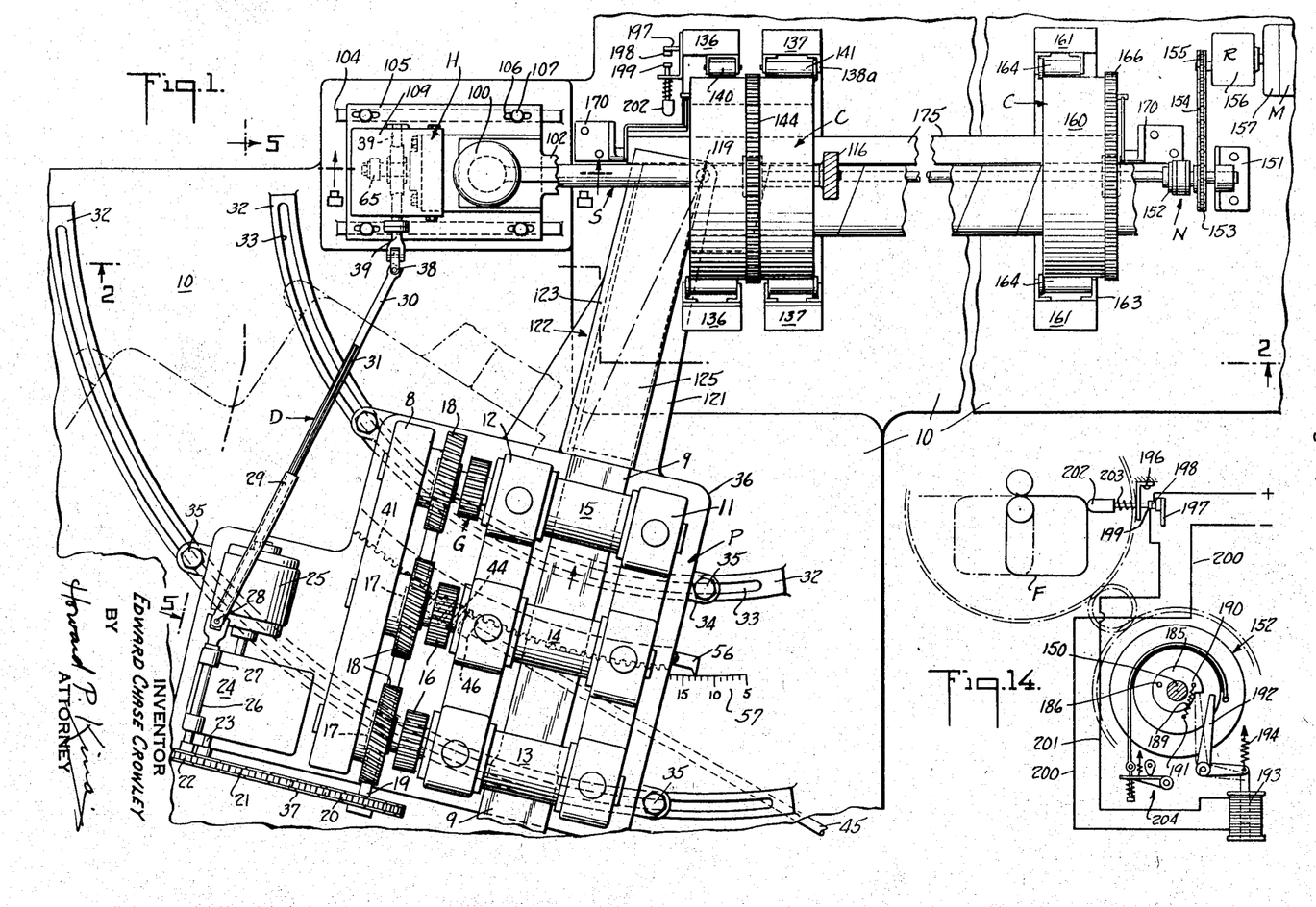
Figure 1 is a plan, broken away in part, and showing essentials of a machine embodying my invention.
Figure 14 is a diagrammatic view of automatic electro-mechanical clutch operating mechanism for automatic periodic actuation of the cage.
Figure 15:
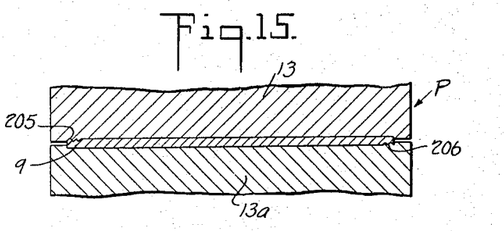
Figure 15 is a section transverse to the strip and the rolls illustrating scoring being formed upon diagonally opposite edges of a single strip of metal.
Figure 16:
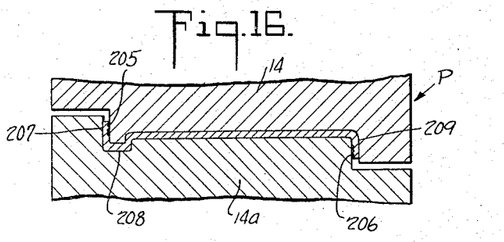
Figures 16 and 17 are sections transverse to the strip and showing successive steps in bending the margins thereof preparatory to making the seam.
Figure 17:
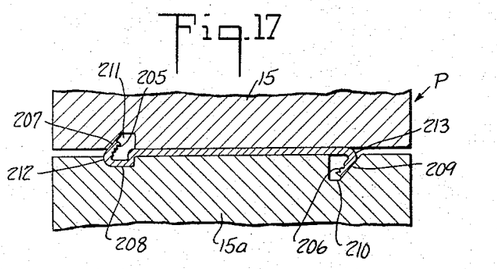

In the specific embodiment of the invention illustrated in said drawings there is shown in Figure 1, a strip material 9 which is introduced to the machine at the preforming rolls which are mounted on the front end of a swivel table. The strip 9 passes through the set of preforming rolls as shown in Figs. 15, 16 and 17. The rolls 13—13ª perform the first operation of slightly tapering and applying a scored surface on opposite edges and faces of the strip 9 as shown at 205 and 206. Said strip 9 then passes through another set of preforming rolls 14—14ª where the two edges 205 and 206 are modified as shown at the left hand side of Fig. 16 at 207 and 208; the opposite side edge is shown modified at 209.

Next the strip 9 passes through a third set of preforming rolls 15—15ª where the shapes or the two edges 205 and 206 are further modified and prepared for their subsequent interengagement. Such further modification is shown in Fig. 17 as consisting of changing the shoulder 213 from a right angle to an acute angle and swinging strip portion 209 inwardly from a line vertical to the strip 9 to a line diagonal thereto at 210 and pointing toward the medial line of the strip; and also changing shoulder 212 from a right angle to an acute angle and swinging in strip portion 207 from a line vertical to the strip 9 to a line diagonal thereto, as indicated at 211, and pointing toward said medial line.

Figure 3:
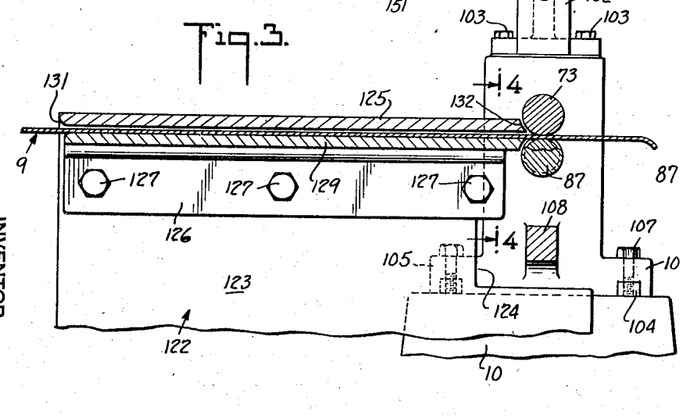
Figure 3 is a cross-sectional view substantially on line 3—3 of Figure 2 of a portion of the machine and on a somewhat increased scale over that of Figure 2.
Figure 4:
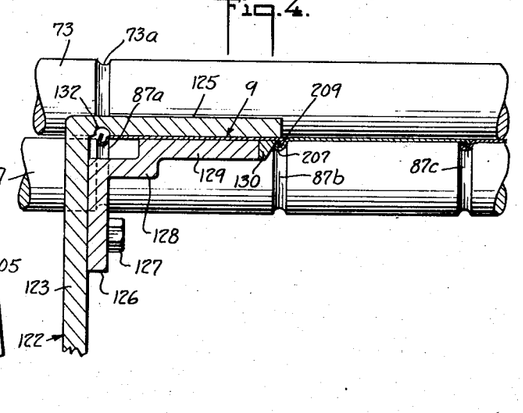
Figure 4 is a sectional view substantially on line 4—4 of Figure 3 and with the scale again increased over the scale of the preceding figures.
Figure 18:
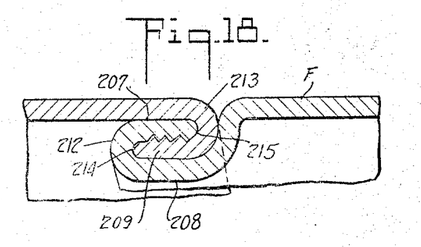
Figure 18 is a cross-sectional and fragmental view of a finished seam, showing the disposition of the grooved and threaded portions of said opposite strip edges in the interior of said seam and the complete enclosure of said portions by the interengagement of adjacent strip edges.

Next the strip 9 passes successively through a guide and twice through seaming rolls provided with grooves of different depths, as shown in Figs. 3 and 4 and hereinafter described in detail. During the passage between the seaming rolls the said strip portions 207 and 209, which carry the scoring, are progressively locked and compressed together by the progressive squeeze of the grooves of these seaming rolls. The first engagement of said strip portions 207 and 209 is in the overlapping of said diagonal lines of Fig. 17 when said edges first come together to pass between the rolls. Fig. 18 shows the respective bent edges of the strip in the united form of the lockseam and the respective scored portions of said edges on the interior of the lockseam in the intermeshed and united form of the seal that is completed by said passage through the seaming rolls. It is to be noted that said bent edges are closely wrapped about said scored faces and that the tips of the bent edges are so shaped and disposed, and said scored portions so closely united (their combined thickness is less than twice the thickness of the strip body as shown) and so disposed, that the central area of such lockseam is solidly and completely closed and sealed, as shown at 214 and 215.

Referring now to the general construction embodied herein Figure 1 shows a base plate 10 whose machined surfaces are of different heights necessary to accommodate different mechanisms at their proper levels. Mounted on the base plate 10 are the said preforming rolls P comprising a slidable swivel table P on which are mounted side frames 11 and 12 and a sub-frame 8. Mounted in between side frames 11 and 12 is the set of preforming rolls described above. Said preforming rolls are driven by gears 16, 17, 18, which in turn are driven by shaft 19 which is mounted in suitable bearings. Shaft 19 is driven through a chain sprocket 20, chain 37 and chain sprocket 22 and shaft 23 to a gear reduction box 24. This in turn is driven by a power drive such as motor 25.

Figure 5:
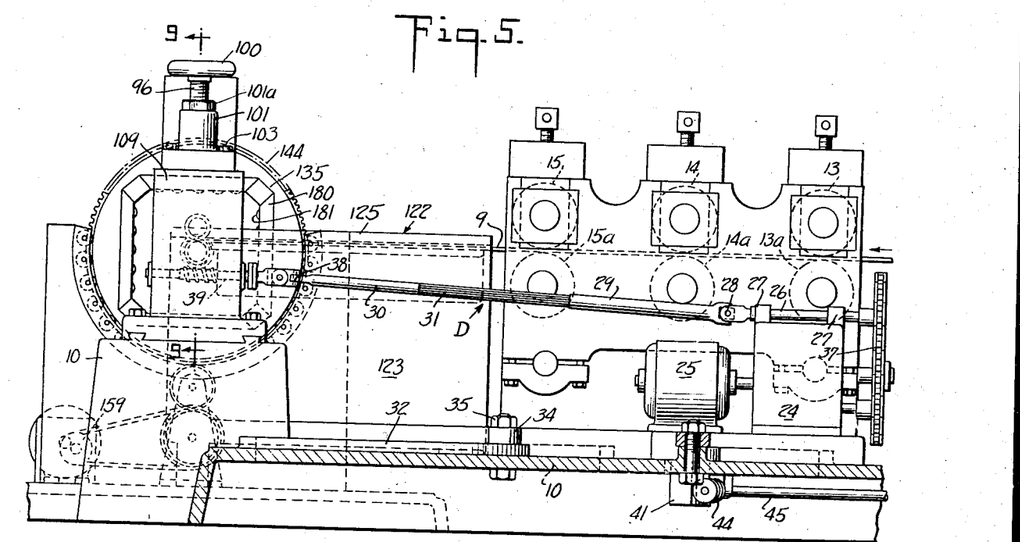
Figure 5 is essentially an end elevation but with the base in section upon line 5—5 of Figure 1 and looking in the direction indicated by the arrows.

An auxiliary drive is taken off through chain 37 to drive the seaming rolls and is best shown in Figures 1 and 5. Driven by chain 37 is a sprocket wheel 21 mounted on a stub shaft 26 journaled in bearings 27, on top of gear reduction box 24. Attached at one end of shaft 26 by means of a universal joint 28 is the sleeve or female portion 29 of a telescoping shaft D, the male portion 30 of which is slidably mounted in said sleeve portion 29 and has on most of its length a spline 31 which insures positive rotation in relation to its driven and driving parts. Male portion 30 is connected by a universal 38 to a worm shaft 39. The telescopic and universal connections permit swinging movement of the entire preforming rolls to any desired angle without disengaging the drive.

Swivel table P which supports the preforming mechanisms, is slidably mounted on arcuate slide rails 32 formed as integral parts of base-plate 10. Said swivel table P is formed with ways or bottom recesses to fit over the arcuate guide rails 32 in such a manner as to assure a relatively smooth slidable movement imparted to said table and preforming mechanisms. Swivel table 36 is pivotally mounted at 119 through an extension 121 of said table P. A spacer 120 of correct dimension is provided at the pivotal mounting 119 (see Fig. 2) to afford clearance between the lower part of extension 121 and the base plate 10. This pivotal mounting is so located that at any angle of the preforming mechanisms the adjacent edges of the strip will be fed through the seaming rolls 72 and 87 with its forward edge at the exact axial centre of the annular groove 87ᵇ in seaming roll 87 (see Fig. 4).

Figures 6, 7:
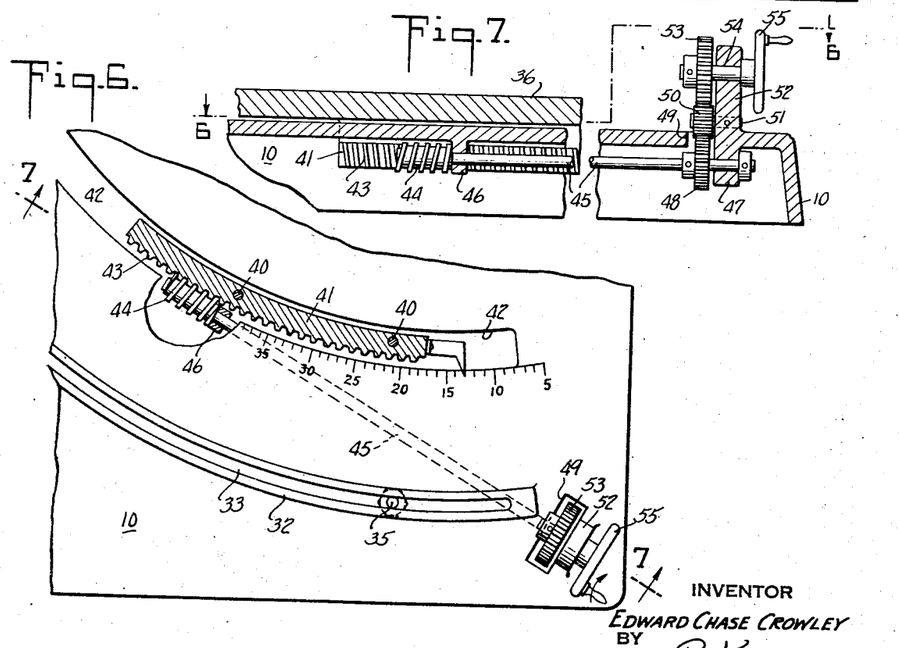
Figure 6 is a horizontal section substantially on line 6—6 of Figure 7, and showing the hand-operated means for adjusting the angular disposition of the preforming rolls with respect to the seaming rolls.
Figure 7 is a vertical section thereof on line 7—7 of Figure 6.
Figure 8:
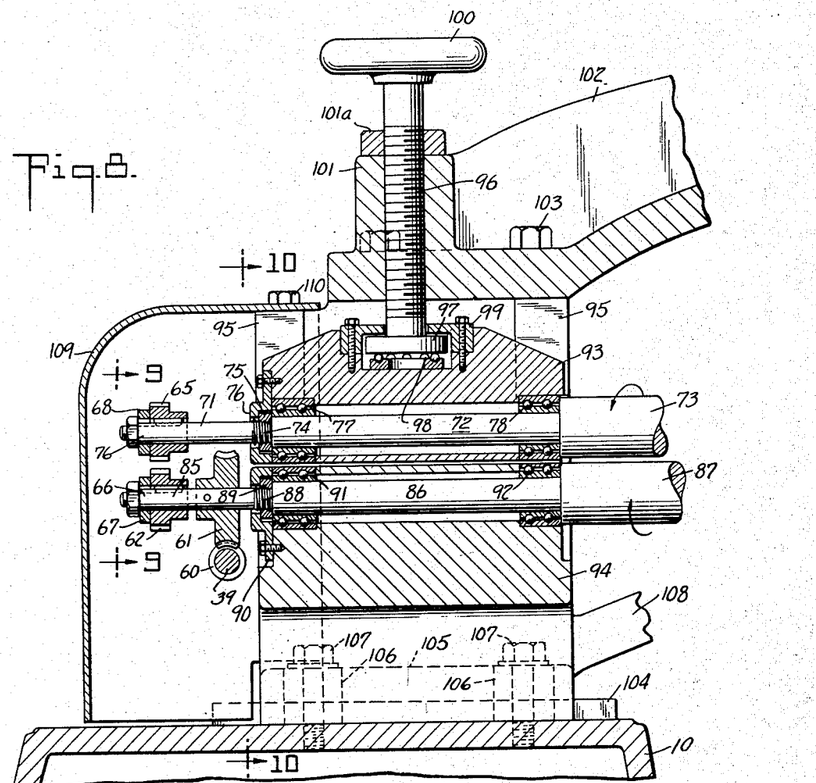
Figure 8 is a vertical section through the head or mounting means for the seaming rolls, taken on line 8—8 of Figure 1.

Elongated arcuate apertures 33 in arcuate guide rails 32, in co-operation with lugs 34 on table P and bolts 35 are the means used to rigidly anchor the preforming mechanisms at any desired angle in relation to the seaming rolls. When it is desired to change the angle of the preforming mechanisms to another angle determined by the shape and size of the arcuate to be produced, bolts 35 are loosened from base-plate 10 and a manually operated hand wheel 55 (Figures 6 and 7) is turned until the desired angle is indicated by the pointer 36 relative to a scale 57 on base plate 10.

The angle adjusting mechanism further comprises mounting wheel 55 on one end of a shaft 54 whose bearing 52 is integral with base plate 10. On the opposite end of shaft 54 a gear 53 meshes with idler gear 50 which in turn drives a gear 48 mounted on shaft 45. Shaft 45 is journaled in bearings 46 and 47 both shown as integral parts of base plate 10. An aperture 49 is necessary in base plate 10 to allow meshing of gears 48 and 50.

On the inner end of shaft 45 is a worm 44 in co-operation with a worm wheel segment 41 with teeth at 43 on the table completes the means for turning the preforming mechanisms around the pivotal axis at 119.

After the strip leaves the preforming rolls it is moved to the stationary guide through which it passes. This guide is mounted on the rear end of said swivel table and is shown in Figures 1, 2, 3 and 4. It is formed by lower plate 129 and upper plate 125 and is the means for guiding and supporting the material as it is being fed to the closing and seaming rolls. It holds the strip steady while the strip is fed through it for the bending movement and prevents buckling during the sliding and bending movements by limiting the motion of the strip to its passage through the guide; and preventing any up or down or lateral movements of the strip during the cycle of bending and sliding movements. This guide also aids in the seam formation as hereinafter stated.

A more complete description of this guide is as follows:

Supported on the extension arm 121 is a lower guide bracket 122 bolted down to arm 121 by bolts 131. Said bracket 122 has a vertical wall 123 in which a cut-away portion 124 (see Fig. 3) is necessary to avoid contact with underslung arm 108 when resetting the preforming rolls to the desired angle required. At right angles to and integral with the vertical wall 123 is an upper guide plate 125. A lower guide plate 129 is bolted to the vertical wall 123 of the bracket 122. A drop in guide 129 (see Fig. 4) serves as a clearance space and grooved track for the left hand modified edge of the strip material. As said modified edge also protrudes in an upwardly direction and above the lower face of upper guide 125 another cut-away portion 132 is provided therein.

As the strip leaves said guide, it is moved to the seaming roll mechanism (shown in general in Figs. 1 and 2 and in detail in Figs. 8, 9, 10 and 11) which is as follows:

Driven through splined shaft 38 and universal 38 is a worm shaft 39 on which is mounted a worm 60, designed to engage a worm wheel 61 keyed to a reduced portion 85 of a shaft or lower seaming roll 87. Also mounted on reduced portion 85 is a gear 62, which drives through a chain of gears 63, 64, 65, to the upper or reduced portion 71 of shaft or upper seaming roll 73.

A bell-crank lever 67 (Fig. 9) is pivotally connected to reduced portion 85 of the shaft 87 at 66 and the opposite end of the bell-crank lever 67 is pivotally connected to the end of a straight link 68, as at 69, the other end of this link being pivotally connected to the reduced portion 71 of the roll 73. This construction is designed to permit the use of various thicknesses of strip material in making the different articles produced by this machine.

Figure 9:
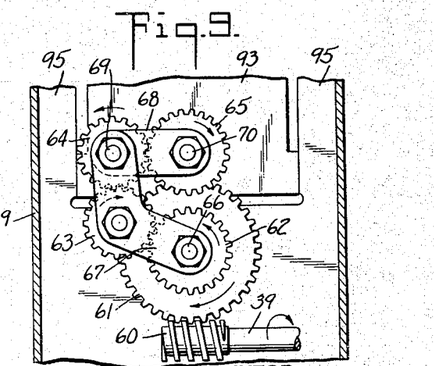
Figure 9 is an end view of the head, with the cover for the same shown in section on line 9—9 of Figure 8 and looking in the direction indicated by the arrows.
Figure 10:
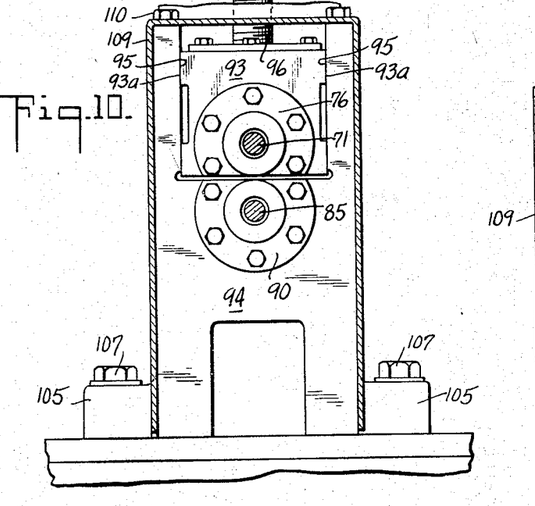
Figure 10 is a similar view but on section line 10—10 of Figure 8 further inward of the head.

The mounting of gears 63 and 64 on the bell-crank lever and inter-connected to the gear 65 through link 68 enables the gears 61 and 65 carried on the shafts 72 and 86 of rolls 87 and 73 to be adjusted on a vertical plane without the disengagement of any teeth of the gear train. Referring to Figure 9 the shaft extension of the upper seaming roll 73 is mounted on a sliding bearing block 93 designed to engage and slide on its machined faces 93ª with the stationary slide faces 95 of a lower bearing block 94.

In the upper and lower bearing blocks 93 and 94 the reduced portions or shafts 72 and 86 of the seaming rolls 73 and 87, are journaled at opposite ends in ball bearings 77, 78 and 91, 92 respectively. At the rear end of reduced portions or shafts 72 and 86 are threaded portions 74 and 88 which take nuts 75 and 89 designed to prevent longitudinal displacement of the seaming rolls 73 and 87. Cover plates 76 and 90 prevent the nuts 75 and 89 from becoming loose to defeat the purpose of said nuts.

Upper bearing block 93 is supported by downwardly extending shaft portion 96 of hand wheel 100, said shaft portion having at its lower end an enlarged head 97 engaging a thrust bearing 98 mounted in a recess of the bearing block 93. Cover plate 99 screwed on to the bearing block 93 is designed to retain against upward displacement but permit free rotation of the head 97.

Shaft portion 96 of the handwheel 100 is in threaded engagement with a boss 101 of an upper seaming roll hanger bracket 102 which in turn is bolted to the upper framework of lower bearing block 94.

This construction permits the raising and lowering of upper bearing block 93 to accommodate the varying thicknesses of strip material, and additionally functions to apply pressure between the upper and lower seaming rolls during the seaming operation. The pressure applied through hand wheel 100 is held by tightening the lock-nut 101ª onto the boss 101 of bracket 102.

Lower bearing block 94 is slidably mounted on base plate 10. Side flanges 105 of bearing block 94 have elongated apertures 106 to permit lateral movement of the groove 87ᵇ in the lower seaming roll 87 in relation to the modified edge portion of the incoming strip material. Lower bearing block 94 is bolted down by bolts 107 and slides on machined slides 104.

Figure 2:
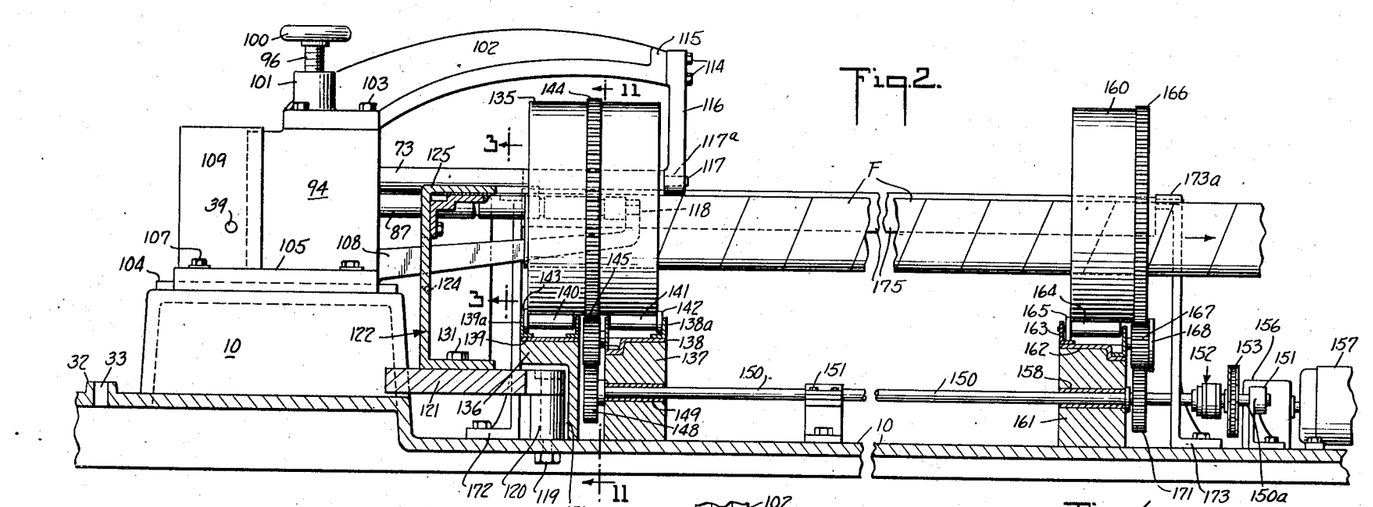
Figure 2 is a longitudinal sectional view on line 2—2 of Figure 1.

Referring now more particularly to Figs. 1 and 2 upper seaming roll 73 extends and passes through a rotatable cylindrical front carrier 135 and is supported therebeyond by a vertically depending arm 116 fastened at its upper end to a flange portion 115 of arm 102 by bolts 114. The lower end of this arm receives a reduced end 117 of seaming roll 73 journaled therein.

The lower seaming roll 87 also extends and passes through carrier 135 and is supported by an underslung arm 108 which is integral with the lower bearing block 94 and also projects through the said carrier to provide a journal support 118 for the forward end of said seaming roll 87.

As the strip leaves the seaming rolls it is moved horizontally under a pusher, which is part of the bending mechanism for a predetermined distance until the strip contacts one of the inside walls of the cage or carrier and shaper. This carrier as herein shown in Figs. 1 and 2, consists of two spaced apart cylindrical sections with an interior framework outlining a hollow square space in the center thereof of approximately four times the cross-sectional dimensions of the square to be formed therein. At the start of a bending movement, the tube rests in a corner in the lower right hand quadrant of the cylinder as viewed in Fig. 11. When the carrier is rotated a quarter turn to make a 90° corner in the tube, the tube likewise is caused to make a quarter turn around the lower seaming roll in which it is suspended. This tumbling or arcuate motion of the tube brings it to the corner in the lower left hand quadrant of the cylinder. The sliding motion is from the left corner horizontally back to the next corner across the intervening space and with the tube supported from below by the interior framework of the cylinder. In other words, the sliding motion is on the line of the chord of the arc described by the bending movement and fixed by the diagonal of the tube as a radius. The mechanism shown gives continuous support to the tube in all its positions and movements. Obviously, a rectangular tube, merely calls for a rectangular outline of the interior of the framework of the cylinder to provide support for the two different lengths and positions of the two arcs and chords described by the rotation of a rectangle as aforesaid.

The means for supporting the front and rear carrier sections 135 and 160, and the mechanisms for controlling them are best shown in Figs. 1, 2, 5 and 11.

A pair of supporting blocks 136 and 137 are mounted on the base plate 10 in any suitable manner. The guide blocks 136 and 137 each have an inner face which is substantially semi-circular in shape and with its upper extremities terminating a little above the horizontal axis of the carrier so that, in co-operation with the supporting rolls 140 and 141, carrier 135 will be prevented from any jumping movement due to its rotation.

Mounted on the inner surface of the supporting blocks 136 and 137 are metal bands 138 and 139 also semi-circular in shape and secured in any suitable manner to the semi-circular faces of said blocks. Secured in any suitable manner to the metal bands are two sets of roller-supporting angle-irons 138a and 139a which are also substantially semi-circular in appearance. Supported between angle-irons 138a, 138a and 139a, 139a are the supporting rollers 140 and 141 which carry the weight of carrier 135.

The supporting rollers 140, 141 have at their outside edges flanges 142 and 143 which in effect provide a track in which the carrier rotates and prevent any lateral sliding movement.

A ring gear 144 secured to and on the outside of the carrier 135 is driven by an intermediate gear 145 mounted on the inner angle iron 138a. Intermediate gear 145 in turn is driven by a gear 148 which is secured to a driving shaft 150 mounted and journaled in bushing 149 of block 137. Shaft 150 is further supported and journaled in bearing 151 and bushing 158 in block 161.

A similar carrier 160 is located some distance to the right of carrier 135, as viewed in Fig. 2, to receive and guide the finished product prior to the cutting-off mechanism (not shown). Carrier 160 is spaced away from carrier 135 according to the length and weight of product or tube, say for example eight feet. Additional carrier sections may be used as desired. Carrier 160 has at its right-hand circumferential edge a ring gear 166. Supporting the carrier 160 are rollers 164 mounted in angle irons of substantially semi-circular shape which in turn are secured to a metal band 162 which in turn is mounted in substantially semi-circular supporting block 161. A gear 171 secured to driving shaft 150 turns gear 167, thus causing carrier 160 to revolve at the same speed as carrier 135 through co-operation with ring gear 166.

The motive power to drive above-mentioned carriers 135 and 160 is taken from a motor 157 through a reduction gear box 156 to sprocket wheel 155 and chain 154 to sprocket wheel 153 secured to shaft 150a. An intermittent or one-revolution clutch of any well known make, 152, has part of its elements connected to shaft 150a and part to shaft 150; further elements of the clutch are constructed in such a manner that the clutch can disengage itself from shaft 150 at any predetermined moment enabling said carriers to be stopped during rotation and at the time when the bending of the strip takes place.

Figure 11:
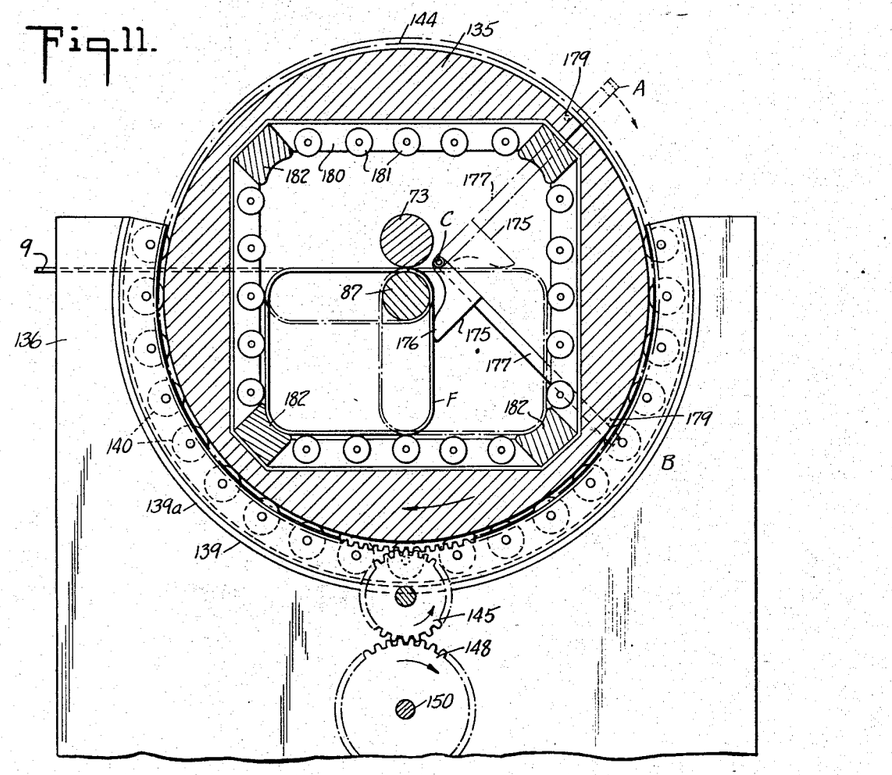
Figure 11 is a cross-section substantially on line 11—11 of Figure 2 and showing the cage and bending means or pusher in operation.

As shown in Figure 2, there are two upright members 172 and 173 bracketed and bolted to base plate 10 to support a triangular pusher block 175 (see also Fig. 11). These uprights 172 and 173 are positioned respectively to the left of carrier 135 and to the right of carrier 160 in said Fig. 2, and support the pusher 175 between them in pivotal mountings at the top of the uprights as indicated at 173a. In Fig. 2, a mid portion of the pusher is broken away to contract the length of the figure, but the pusher is continuous and extends from upright 172, through carrier 135, from there to and through carrier 160 to upright 173.

Said pusher is, as indicated, triangular in cross-section, and is recessed on one face to form a nose portion 176 next the extremity or apex of that face. This nose portion is the only part of pusher 175 bearing against the strip material to be bent. It will also be seen that the carriers 135 and 160, in co-operation with the pusher or bender 175 is the means used to bend and form the rounded corners of the rectangular or other article or tube being produced. Referring now to Figure 11, this triangular pusher block is free to swing upon and between the bearings and mountings. Extending radially from the pivot center of the pusher bar, and at opposite ends thereof, are two arms 177, 177 designed to be engaged and pushed by pins 179 protruding from the carriers 135 and 160.

Figure 12:
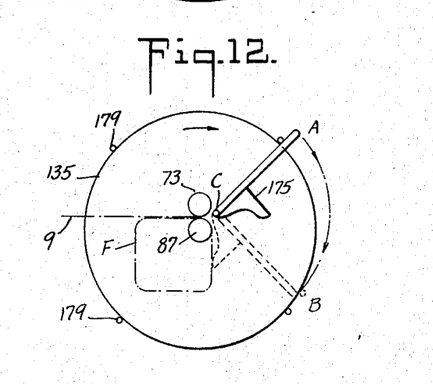
Figure 12 is a similar view to Figure 11, but of diagrammatic character for showing the operative relationship of cage and pusher.
Figure 13:
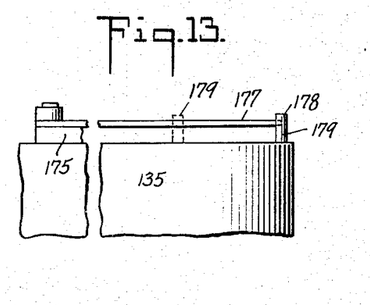
Figure 13 is a plan, broken away in parts, showing the operative driving connection between the cage and pusher.

As the centers of rotation of the above said carriers and the centers of the pusher bar arms 177 are offset one from the other, it will be readily seen, more particularly in Fig. 12, that as arms 177 are being steadily pushed by pins 179 until, in this particular instance, the pins 179 have moved the pusher bar around 90°, that at this point pins 179 are ready to slip off the pusher arms 177 as shown in dotted lines in Fig. 12 and in full lines in Fig. 13. At this point also, and by electrical means hereinafter to be described, the clutch 152 is operated in such a manner as to stop rotation of the carriers 135 and 160.

It will be remembered that the strip being fed to the machine is fed continuously. When the carriers are automatically stopped as just described, the strip is still feeding in, and its motivation is utilized to start the carriers in operation again as will now be described.

On the inside of the carriers 135 and 160, and secured thereto in any suitable manner, are angle-iron frames 180 designed to support and journal idler rollers 181 in rectilinear series, while at the corners between such series are angle blocks 182 there located and concaved to assist in the bending operation. Incoming, continuously moving strip 9 in conjunction with the rectangular shaped portion of the article already formed, slides on rollers 181 until it reaches the extreme position in the carrier indicated by dot and dash lines in Fig. 11. At such position, the extreme wall of the formed article pushes against a button 202 (see Fig. 14, Sheet 1) depressing it against action of a spring 203 mounted against a support 196. The button is connected to a switch contact 199 which is moved by depression of the button into engagement with a fixed contact 198, thereby closing an electrical circuit to a solenoid 193 which in turn operates a bell-crank 192 to disengage the bell-crank lever from a one-toothed disc 185 pivoted at 186. Release of this disc closes the clutch on shaft 150 thereby setting in motion the rotation of carriers 135 and 160 which releases button 202 and permits the switch contacts to disengage, stops the current flow to the solenoid, and enables spring 194 to then actuate the bell-crank 192 back to normal position so the tooth of disc 185 will contact it when the disc completes its revolution. This tensions spring 188 one end of which is carried on post 190 on the disc and the other end of which is on post 191 on the clutch and thereby releases the clutch on shaft 150 and stops rotation of the carriers once again. For a rectangular article as shown, the carriers are stopped on each quarter turn.

A braking means 204 is shown in Fig. 14, designed to brake the clutch 152 a moment before said clutch releases its connection, thereby assuring proper stopping of the rotation at the completion of the 90° rotation of the carriers.

When the operation is initiated with a new strip of material 9, the strip is allowed to run well past the seaming roller 73 and the switch button 202 is then operated for the initial movement of the carriers, by hand or otherwise as may be found expedient. The carriers then make their first 90° revolution, actuating the pusher bar or bender 175 to move with it and thereby effect the first 90° bend in the strip. When that angle is attained, the pusher arms release enabling the pusher bar to swing back to initial position and in contact with the next pin 179. Also when the 90° bend is attained the clutch mechanism has functioned to again release and the carriers therefore stop rotating. But as the strip is feeding constantly, it pushes forward until the bent end strikes button 202, whereupon the carriers and pusher bar again make a 90° bend in the strip. This operation continues and thus forms a tube or product having successively straight line faces and curved corners.

It will be remembered that the strip has its edges pre-formed or curled. The first interengagement of these curled edges of the strip takes place initially when the carriers have made bending revolution of 360° which, for the product described, occurs after the fourth bend, that is, when the part first bent downward completes the first convolution by again appearing at the top in horizontal position. The left-hand edge of this first formed convolution comes under the right-hand curled edge of the incoming strip as it comes to the closing rolls. This operation is shown in Figure 4, where the hardened and diagonally sloping face 130 of the lower flat guide 129 also serves as an anvil to receive the impact and to deflect and laterally push the upcoming edge 207 of the formed convolution (Figure 18) into loose engagement with the edge 209 of the arriving portion of the strip.

After this loose engagement is made, the left-hand edge of the incoming strip passes alone through groove 73a of the upper seaming roll 73 and groove 87a of the lower seaming roll 87. The said edges 207 and 209 pass together through groove 87b in the lower seaming roll where these edges are forced into closer engagement, and this engagement is completed after the material has made a complete convolution on the second passage of these joined edges through the rolls in groove 87c, resulting in the tightly closed seam on the inside of the tube or product, as appears in the enlarged section of Fig. 18.

Figure 19:
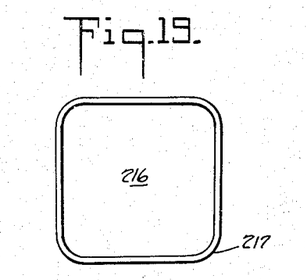
Figures 19 to 22 are end views of various tube formations which may be fabricated by use of the present invention.
Figure 20:
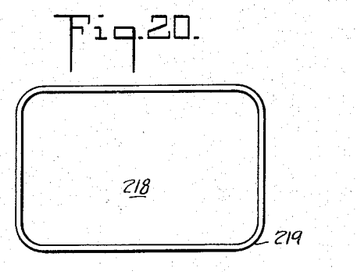
Figure 21:
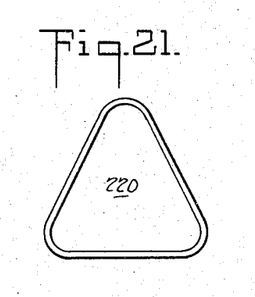
Figure 22:
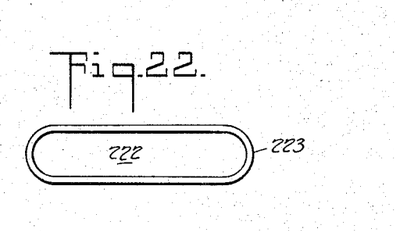
Figure 23:
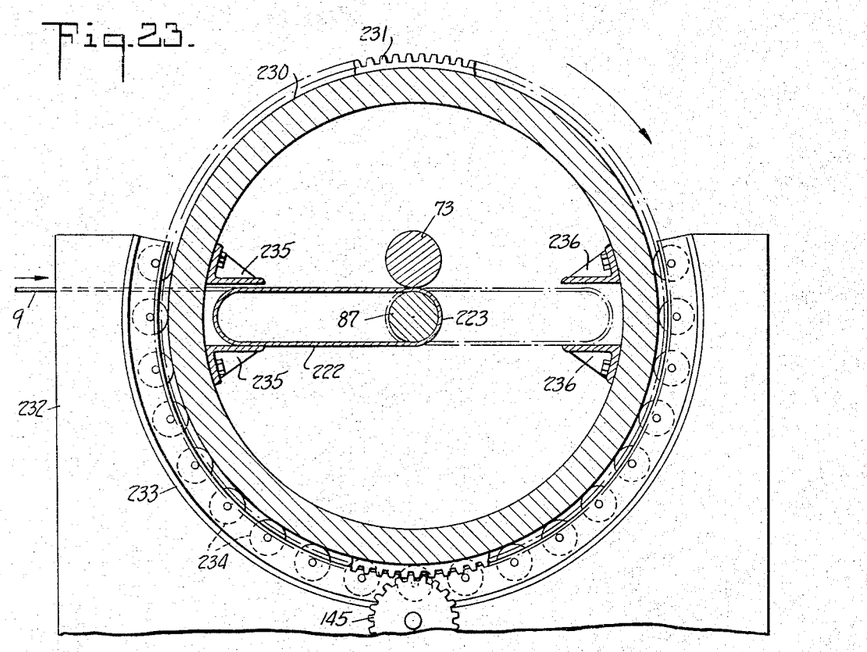
Figures 23 and 24 are cross-sectional views similar to Figure 11, showing the cage structure for fabricating tubes of shapes illustrated in Figs. 22 and 21 respectively.
Figure 24:
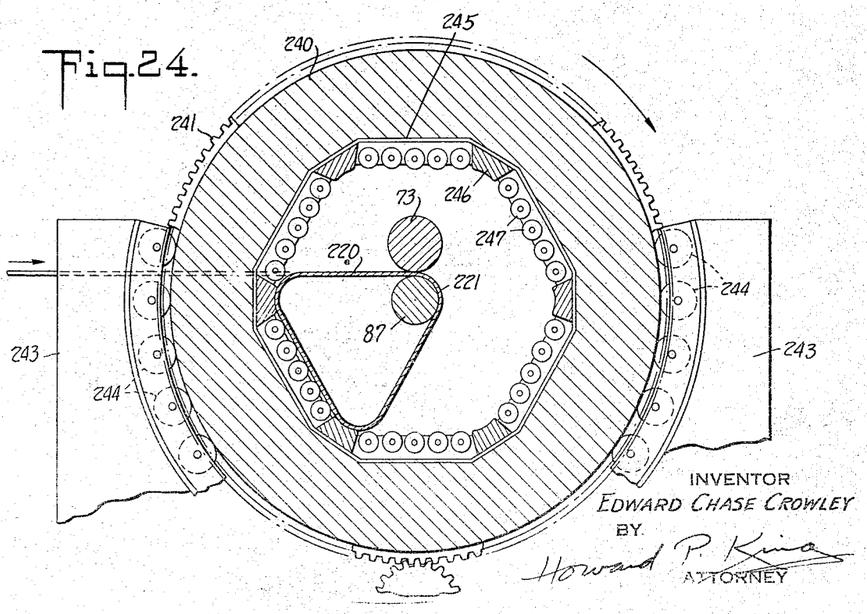

Figure 19 shows the cross-sectional shape of a tube having four equal flat sides and rounded corners as produced in the machine as specifically described above. A rectangular cross-sectional outline of tube is shown in Figure 20 and can be produced on this machine with only a change in the interior of the carrier sections as above stated. Such a rectangular tube is shown being fabricated in Figures 27-29. An end view of a triangular tube is shown in Figure 21. This type is formed by the modified type of carrier shown in Figure 24. In Figure 23 is shown the modified type of carrier for producing a flattened type of tube with rounded edges as illustrated in end view in Fig. 22. The tubular products shown in Figures 20-22 can be made on this machine by using said modified carriers and by changing the driving gear ratios to give the required rotation to the aforesaid carriers. To produce the tube shown in Figure 23, it is not necessary to use the pushing mechanism described above. In the place thereof, the two pairs of oppositely disposed shelves 235 and 236 are bracketed to the inside of the carrier as indicated in Figure 24 and serve to bend and support the article.

Figure 25:
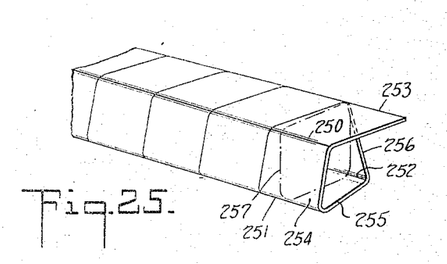
Figure 25 is a perspective view of a tube of rectangular cross-section formed according to the present invention.
Figure 26:
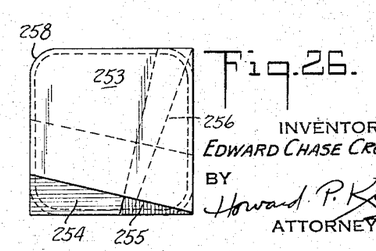
Figure 26 is an end view of a tube having the gore slit and bent and folded to form an end for the tube.

Figures 25 and 26 are respectively a perspective view of a tube section and an end view, the first showing the gore as formed in the machine, and the second showing the gore after its corners are slit and the flaps turned in. Gores as indicated in Figure 25 will be at both ends of a tube when a strip is run through the machine to its end. Instead of cutting off these gores to square the tube, it is proposed to utilize these gores to close and brace the ends having the same. This is accomplished by slitting the gores at the corners, trimming and folding inwardly the flaps then remaining into a plurality of layers and then welding or brazing the whole so as to have a strong and solid end integral with and made of the same material as so extended as the main part of the tube section.

In Figure 26 the corners are shown slit at 250, 251 and 252. The fourth corner need not be slit because it is already a raw edge. The slits may be trimmed to give proper angle to the sides so they will not project beyond the side face next to which they are folded down. The end pieces 253, 254, 255 and 256 thus formed are now folded down to the approximate position shown in dash lines in the figure. The smaller of the flaps, 256, is folded in first, followed successively by the other flaps 255, 254 and 253. Trimming of the edges may be done as indicated above before making the folds, or may be done after the folds are made, if desired.

Figures 27, 28, 29:
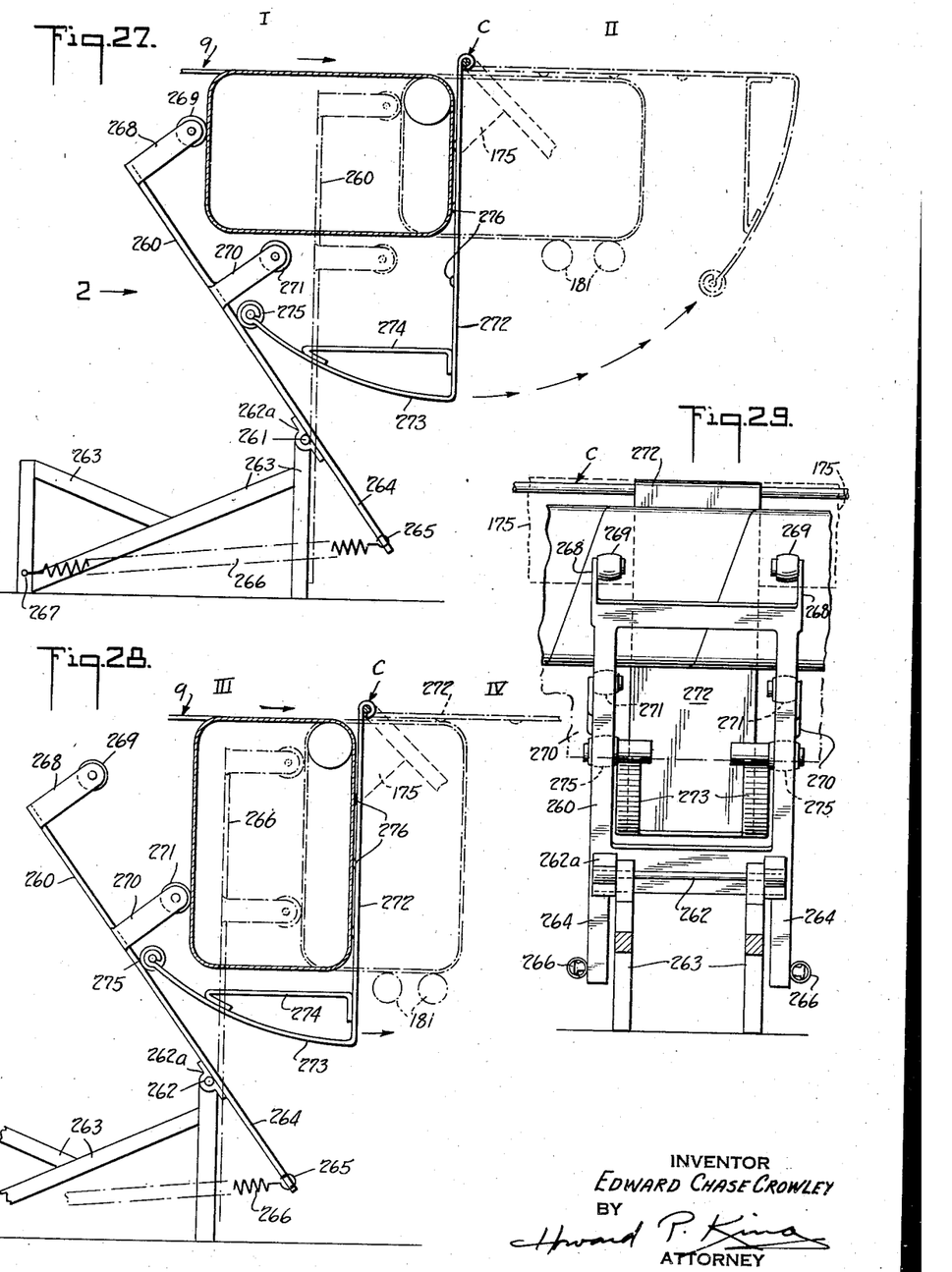
Figure 27 is a cross section of the tube at the omitted portion thereof in Figure 1, and showing the means for lateral shifting of the tube during the fabricating process.
Figure 28 is a similar cross-section showing the tube revolved 90° from the showing of Figure 27.
Figure 29 is a face view of the shifting means.

Figures 27-29 show an embodiment of an auxiliary means of pushing the article upon completion of each 90° bend to supplement the pushing by the feeding in of the strip. This auxiliary means when used would be situated in that part of the machine broken away in Figures 1 and 2, so it does not appear in those particular views. In the specific disclosure the auxiliary pusher is formed of a frame-like member 260 having a pivot 262 and journals 262a mounted on a support 263. The extended portion 264 of member 260 below the pivot 262 has lugs 265 which take springs 266 the other ends of which are anchored to the rear of supports 263 at 267.

Frame 260 has at its top end an arm 268 integral with and at right angles to said frame 260. Journaled on the arm is a roller 269 designed to contact the short side of the article and push it over to position shown in dot and dash lines in Fig. 27 on the rollers 181 of Fig. 11.

In an intermediate position on frame 260 is another arm 270 supporting a roller 271 which works similarly to roller 269 just described, when pushing on the long side of the rectangular article as shown in Fig. 28.

A dependent angular arm 272 moves in the same path as pusher bar 175 and is operated by the same mechanism as shown in Fig. 13. Arm 272 is pivoted at C and has arcuate strap portion 273, its radius being large enough so that during its functioning it clears all other functioning parts except frame 260. Said arcuate strap 273 is reenforced at 274 and at its free end journals a roller 275 situated to engage the frame 260 and swing said frame back into preparatory position against action of spring 266. Arm 272 has on its inner face protrusions 276 designed to engage the surface of the article with the least amount of friction.

The several steps in the operation designated by Roman numerals I, II, III and IV (Figs. 27-29) show at I by the full-line showing of the tube, a corner bend just completed and pusher roll 269 engaging the tube ready to push it. The pusher roll 269 thereupon pushes the tube to the dotted line position II of Fig. 27. The machine then makes a corner bend which brings the tube into the full-line position III of Fig. 28. Pusher roll 271 is in engagement with the tube in this position and thereupon pushes the tube to the dotted line position IV of Fig. 28. A corner bend is then made, bringing the tube back to the full line position of Fig. 27. Each time a corner bend is made, arm 272 swings down and returns the pusher frame to its rearward position ready for the next push.

I claim:

1. A machine for forming spiral tubes with flat sides and curved corners, comprising means for continuously feeding strip material at other than right angles to the formed tubes in convolutions with adjacent edges spirally situated in the tube and hooking together, a seaming roll within the forming portion of the tube, said roll having a radius equal to the interior radius of curvature of the curved corner, said strip material feeding over said roll and passing along as a straight-away side portion of the tube, and means for intermittently bending said forwardly moving strip material partially around said roll for forming curved corner portions of the tube between successive straight-away portions.

2. A machine for forming spiral tubes with flat sides and curved corners, comprising means for continuously feeding strip material at other than right angles to the formed tubes in convolutions, with adjacent edges spirally situated in the tube and hooking together, a seaming roll within the forming portion of the tube, said roll having a cross-sectional area less than the cross-sectional interior area of the formed tube, said strip material feeding over said roll and passing along as a straight-away side portion of the tube, and means for intermittently bending said forwardly moving strip material partially around said roll for forming curved corner portions of the tube between successive straight-away portions.

3. A machine for forming spiral tubes with flat sides and curved corners, comprising means for continuously feeding strip material at other than right angles to the formed tubes in convolutions with adjacent edges spirally situated in the tube and hooking together, a pair of seaming rolls between which the convolutions of the strip material pass and by which the hooked edges are tightly interlocked in a continuous spiral seam, and means cooperating with one of said seaming rolls successively permitting the strip material as it first passes between said rolls to move forward as a straight-away portion for the tube and then bending the material partially around said one seaming roll thereby forming a curved corner for the tube.

4. A machine for forming spiral tubes with flat sides and curved corners, comprising means for continuously feeding strip material at other than right angles to the formed tubes in convolutions with adjacent edges spirally situated in the tube and hooking together, a pair of seaming rolls between which the convolutions of the strip material pass and by which the hooked edges are tightly interlocked in a continuous spiral seam, one of said seaming rolls having a radius equal to the interior radius of the curved corner, and means cooperating with said one seaming roll successively permitting the strip material as it first passes between said rolls to move forward as a straight-away portion for the tube and then bending the material partially around said one seaming roll thereby forming a curved corner for the tube.

5. A machine for forming spiral tubes with flat sides and curved corners, comprising means for continuously feeding strip material at other than right angles to the formed tubes in convolutions with adjacent edges spirally situated in the tube and hooking together, a pair of seaming rolls between which the convolutions of the strip material pass and by which the hooked edges are tightly interlocked in a continuous spiral seam, one of said seaming rolls having a cross-sectional area less than the cross-sectional interior area of the formed tube, and means cooperating with said one seaming roll successively permitting the strip material as it first passes between said rolls to move forward as a straight-away portion for the tube and then bending the material partially around said one seaming roll thereby forming a curved corner for the tube.

6. A machine for forming spiral tubes with flat sides and curved corners from strip material, comprising means for intermittently bending a forwardly moving strip material thereby providing alternating straight-away portions as sides of the tube and bent portions as corners of the tube, means for shifting the tube laterally during formation of said straight-away portions, means for slidably supporting said tube as it makes such lateral shift and means, synchronized with said bending means and shifting means, for feeding said strip material into said machine during operation thereof.

7. An apparatus for forming out-of-round tubular structures having alternating plane and curved surfaces for the walls thereof and composed of a strip of metal helically wound upon itself in a series of convolutions with the adjacent edges of the strips forming successive convolutions joined and interlocked, comprising means for preforming the edges of the strip for interengagement, a pair of seaming rolls for locking the edges of successive convolutions together in the formation of a seam, means for advancing said strip through said preforming means and seaming rolls, supporting means for carrying said tubular structure forward during formation of said plane surfaces and means for bending said strip for the formation of said curved surfaces.

8. An apparatus for forming out-of-round tubular structures having alternating plane and curved surfaces for the walls thereof and composed of a strip of metal helically wound upon itself in a series of convolutions with the adjacent edges of the strips forming successive convolutions joined and interlocked, comprising means for scoring opposite faces of the strip at opposite edges thereof with longitudinal grooves, means for preforming the edges of the strip for interengagement, a pair of seaming rolls for locking the edges of successive convolutions together in the formation of a seam with said scored edges in overlapped relation within the interior of the seams, means for advancing said strip through said preforming means and seaming rolls, supporting means for carrying said tubular structure forward during formation of said plane surfaces and means for bending said strip for the formation of said curved surfaces.

9. An apparatus for forming out-of-round tubular structures having alternating plane and curved surfaces for the walls thereof and composed of a strip of metal helically wound upon itself in a series of convolutions with the adjacent edges of the strips forming successive convolutions joined and interlocked, comprising means for preforming the edges of the strip for interengagement, a pair of seaming rolls for locking the edges of successive convolutions together in the formation of a seam, means for advancing said strip through said preforming means and seaming rolls, supporting means for carrying said tubular structure forward during formation of said plane surfaces and means for bending said strip while said strip is in motion, comprising a lever mechanism actuated in coordination with strip advancing means for the formation of said curved surfaces.

10. An apparatus for forming out-of-round tubular structures having alternating plane and curved surfaces for the walls thereof and composed of a strip of metal helically wound upon itself in a series of convolutions with the adjacent edges of the strips forming successive convolutions joined and interlocked, comprising means for preforming the edges of the strip for interengagement, a pair of seaming rolls for locking the edges of successive convolutions together in the formation of a seam, means for advancing said strip through said preforming means and seaming rolls, supporting means for carrying said tubular structure forward during formation of said plane surfaces and formed with separate sections for receiving and supporting said tubular structure during formation of each plane surface and means for bending said strip for the formation of said curved surfaces.

11. An apparatus for forming out-of-round tubular structures having alternating plane and curved surfaces for the walls thereof and composed of a strip of metal helically wound upon itself in a series of convolutions with the adjacent edges of the strips forming successive convolutions joined and interlocked, comprising means for preforming the edges of the strip for interengagement, a pair of seaming rolls for locking the edges of successive convolutions together in the formation of a seam, means for advancing said strip through said preforming means and seaming rolls, supporting means for carrying said tubular structure forward during formation of said plane surfaces and means for bending said strip for the formation of said curved surfaces, said supporting means being displaceable during the operation of said bending means.

12. An apparatus for forming out-of-round tubular structures having alternating plane and curved surfaces for the walls thereof and composed of a strip of metal helically wound upon itself in a series of convolutions with the adjacent edges of the strips forming successive convolutions joined and interlocked, comprising preforming means for shaping the edges of the strip and seaming rolls for securely locking the edges of the strips of successive convolutions together, and means for supporting said formed tubular structure and carrying the same in a rectilinear path in line with said seaming rolls during formation of the seams along said plane surfaces.

13. An apparatus for forming out-of-round tubular structures having alternating plane and curved surfaces for the walls thereof and composed of a strip of metal helically wound upon itself in a series of convolutions with the adjacent edges of the strips forming successive convolutions joined and interlocked, comprising preforming means for shaping the edges of the strip and seaming rolls for securely locking the edges of the strips of successive convolutions together, means for supporting said formed tubular structure and carrying the same in a rectilinear path in line with said seaming rolls during formation of the seams along said plane surfaces, and means for swinging said formed structure during formation of said curves into position to produce interengagement of the adjacent shaped edges of successive strip convolutions for the length of the plane surface to be seamed.

14. An apparatus for forming out-of-round tubular structures having alternating plane and curved surfaces for the walls thereof and composed of a strip of metal helically wound upon itself in a series of convolutions with the adjacent edges of the strips forming successive convolutions joined and interlocked, comprising preforming means for shaping the edges of the strip and seaming rolls for securely locking the edges of the strips of successive convolutions together, and means for supporting said formed tubular structure and carrying the same in a rectilinear path in line with said seaming rolls during formation of the seams along said plane surfaces, said seaming rolls applying two successive operations to successive seams, in first locking the seamed edges together and second compressing and consolidating the locked seam.

15. The method of forming tubular structures having alternating plane sides and curved corners and composed of a strip of metal formed with preshaped edges and helically wound upon itself in a series of continuous convolutions, comprising forming convolutions in said strip of metal by continuously feeding said strip forward longitudinally of itself and seaming the oncoming strip to the previously formed convolutions in the formation of said plane sides while moving said previously formed convolutions forward in a rectilinear path, and seaming the oncoming strip to the previously formed convolutions and simultaneously bending said oncoming strip in the formation of said curved corners while swinging said convolutions in an arcuate movement.

16. The method of forming tubular structures having plain walls and curved corners comprising longitudinally grooving and crimping the edge portions of a continuous metal strip so that they will hook one into the other with said grooves in the interior of the seam so formed when said strip is assembled on itself in a continuous helical formation of continuous convolutions, with each convolution having the same cross sectional dimensions and outline as, and constituting a part of, the body of such tubular structures, forming such convolutions by the continuous forward feeding of said strip in a rectilinear path and the intermittent and cyclic backward bending of longitudinal sections of said strip as so advanced by making a uniform oblique and transverse curve at the ends of such sections, winding such convolutions in a continuous helical formation and locking the edges thereof together in a continuous helical seam by alternately rotating said longitudinal sections backward in an arcuate path and moving the same forward in a horizontal path in a cyclic series of movements wherein each said longitudinal section is intermittently moved from one position and presented in another position alongside of, but in advance of, said forwardly feeding strip, with one grooved and crimped edge of said longitudinal section in substantial vertical alignment with the complementary grooved and crimped edge of the feeding strip and wherein said longitudinal section is moved forward horizontally with said feeding strip and said complementary edges locked together to form said seam during both said rectilinear and bending movements of said sections.

17. An apparatus for forming tubular structures having alternating curves and straight lines defining their cross sectional dimensions and composed of a strip of metal helically wound upon itself in a series of convolutions with the adjacent edges of the strip preliminarily flanged, joined and interlocked in the forming of successive convolutions, comprising seaming devices, means for supporting the formed tubular structure as the seaming devices form the seam on the straight side of the structure, bending means for turning the tubular structure as the curves are formed and means for preventing lateral and vertical movement in the advancing strip during the bending and seaming operation, and including grooves for receiving the flanges of said strip.

18. An apparatus for forming tubular structures having alternating curves and straight lines defining their cross sectional dimensions and composed of a strip of metal helically wound upon itself in a series of convolutions with the adjacent edges of the strip preliminarily flanged, joined and interlocked in the formation of successive convolutions, comprising seaming devices, means for supporting the formed tubular structure as the seaming devices form the seam on the straight side of the structure, bending means for turning the tubular structure as the curves are formed and means for preventing lateral and vertical movement in the advancing strip during the bending and seaming operation, combined with means to guide one flanged edge of said advancing strip between seaming rolls in company with and loosely joined to an adjacent and complementary flanged edge of a formed convolution.

19. The method of forming tubular structures from strip metal comprising forming longitudinally extending scores in the surfaces of said strip metal near the opposite side edges thereof, bending said edges into complementary formations for interlocking engagement in the production of a continuous interlocked seam, helically winding said strip into continuous convolutions, interlocking said edges of contiguous convolutions, and simultaneously seaming and sealing the same by interengaging the bent edges of opposite sides of the strip, with the scores of opposed surfaces in intermeshing engagement, and, while confining the material of said interlocked edges against spreading, tightly compressing said interlocked edges to completely lock and seal the central area of said seam.

20. The method of forming, seaming, and sealing, in concurrent operations, tubular structures from a strip of metal, said method comprising forming longitudinally extending, continuous scores on opposite faces of a strip of metal of indefinite length near the opposite side edges thereof, and transversely bending the scored edges of said strip into complementary formations suitable for being interlocked in a four-ply interlocked seam, interengaging the bent edges of opposite sides of the strip, with said scored faces in contact and said scores in intermeshing engagement, and with said edges interlocked in a four-ply formation, and simultaneously bending said strip into contiguous convolutions to form a tubular body and, while confining the material of said interengaged edges against spreading, sealing the seam so formed by tightly compressing the interlocked edges to completely close and seal the central area of said seam.

EDWARD CHASE CROWLEY.